(12) United States Patent
Wei

(10) Patent No.: US 11,354,940 B2
(45) Date of Patent: Jun. 7, 2022

(54) METHOD AND APPARATUS FOR FOREGROUND GEOMETRY AND TOPOLOGY BASED FACE ANTI-SPOOFING

(71) Applicant: KONICA MINOLTA BUSINESS SOLUTIONS U.S.A., INC., San Mateo, CA (US)

(72) Inventor: Junchao Wei, San Mateo, CA (US)

(73) Assignee: KONICA MINOLTA BUSINESS SOLUTIONS U.S.A., INC., San Mateo, CA (US)

( * ) Notice: Subject to any disclaimer, the term of this patent is extended or adjusted under 35 U.S.C. 154(b) by 282 days.

(21) Appl. No.: 16/836,525

(22) Filed: Mar. 31, 2020

(65) Prior Publication Data

US 2021/0303890 A1    Sep. 30, 2021

(51) Int. Cl.
*G06V 40/40* (2022.01)
*G06T 7/194* (2017.01)
*G06V 10/25* (2022.01)
*G06V 40/16* (2022.01)

(52) U.S. Cl.
CPC ............. *G06V 40/40* (2022.01); *G06T 7/194* (2017.01); *G06V 10/25* (2022.01); *G06V 40/165* (2022.01); *G06V 40/171* (2022.01)

(58) Field of Classification Search
CPC ...... G06V 40/40; G06V 10/25; G06V 40/165; G06V 40/171; G06V 40/161; G06T 7/194
See application file for complete search history.

(56) References Cited

U.S. PATENT DOCUMENTS

| 8,856,541 | B1 | 10/2014 | Chaudhury et al. |
| 9,619,723 | B1 | 4/2017 | Chow et al. |
| 9,690,998 | B2 * | 6/2017 | Negi ............... G06V 40/16 |
| 10,268,911 | B1 * | 4/2019 | Wu ............... G06V 40/171 |
| 11,048,953 | B2 * | 6/2021 | Zou ............... G06V 40/45 |
| 2018/0260643 | A1 | 9/2018 | Sheikh Faridul et al. |
| 2019/0026544 | A1 | 1/2019 | Hua et al. |

FOREIGN PATENT DOCUMENTS

| CN | 104915649 A | 9/2015 |
| CN | 105993022 A | 10/2016 |
| CN | 108537131 A | 9/2018 |
| CN | 109886244 A | 6/2019 |

\* cited by examiner

*Primary Examiner* — Phuoc Tran
(74) *Attorney, Agent, or Firm* — Squire Patton Boggs (US) LLP

(57) ABSTRACT

A method and system to detect visual spoofing of a process of authenticating a person's identity employs computer vision techniques to define characteristics of different kinds of spoofing. Embodiments identify a foreground object within an image and by examining positions and/or orientations of that foreground object within the image, determine whether the presentation of the foreground object is an attempt to spoof the authentication process.

20 Claims, 9 Drawing Sheets

METHOD AND APPARATUS FOR FOREGROUND GEOMETRY AND TOPOLOGY BASED FACE ANTI-SPOOFING

BACKGROUND OF THE INVENTION

Face identification applications are becoming more and more popular in many places such as front desk check-in systems, mobile device systems (such as Face ID), and surveillance systems. For image data acquisition, such systems employ simple RGB cameras, which are easy to fool. For example, in many of these systems it is possible for an unauthorized person to provide a printed or a digital image of someone else (an authorized person) in the field of view of the camera. When the camera takes an image or performs facial recognition, the image of the authorized person fools the system into thinking that the unauthorized person really is authorized. This deception is known as spoofing Approaches to address this problem have included the addition of three-dimensional (3D) imaging, so that a flat (two-dimensional) image, whether printed or digital, would not be sufficient. However, providing a 3D camera makes authorization systems more expensive. In addition, there is the possible requirement of some kind of sensor fusion technique, combining RGB camera data with 3D camera data, in order to achieve successful integration.

There have been face detection systems which can detect facial features from other data in an image or video. Such systems can identify the existence of a face in other data, but do not identify whose face is being detected. Even computer vision applications employing robust deep learning based face detection systems pick out something that looks like a face from a background. These systems are not set up to enable a determination of whose face is being detected. In addition, these systems may detect a face, but may not be able to differentiate original faces in a scene from faces in printed photos or on digital devices.

It would be desirable to provide an improved anti-spoofing method and system for existing web camera systems to thwart the most frequent types of spoofing.

SUMMARY OF THE INVENTION

In one aspect, anti-spoofing algorithms address spoofing cases such as a printed photograph, an image or video on a cell phone, or an image or video on a tablet. In these spoofing approaches, the spoofing data in question can be either a video or a static photo or picture. For a video input, aspects of the invention take advantage of a topological relationship between portions of foreground objects (which would include facial features) (i.e. positions, orientations, and transformations) in the foreground mask. For a static photo, aspects of the invention use regular shape detection (i.e. rectangular, square border) to distinguish a spoofed face from a real one.

In one aspect, geometric and topological locations of foreground objects in an image may facilitate detection. For example, a printed photograph and a mobile or tablet device have distinguishable outline shapes such as rectangles or sharp corners. Also, a face location may be floating or centered, and often may be in the middle and enclosed by the rectangle region. On the other hand, if a real person's face appears in the foreground, the contour of the person's face may be irregular, and the detected face region may be on the edge of the foreground and connected directly to the background region. Therefore, in one aspect, there is a focus on a relationship between the detected shape and the contour to identify whether a face is being spoofed.

BRIEF DESCRIPTION OF THE DRAWINGS

Embodiments according to various aspects of the present invention now will be described in detail with reference to the accompanying drawings, in which.

DETAILED DESCRIPTION

Figure 1:
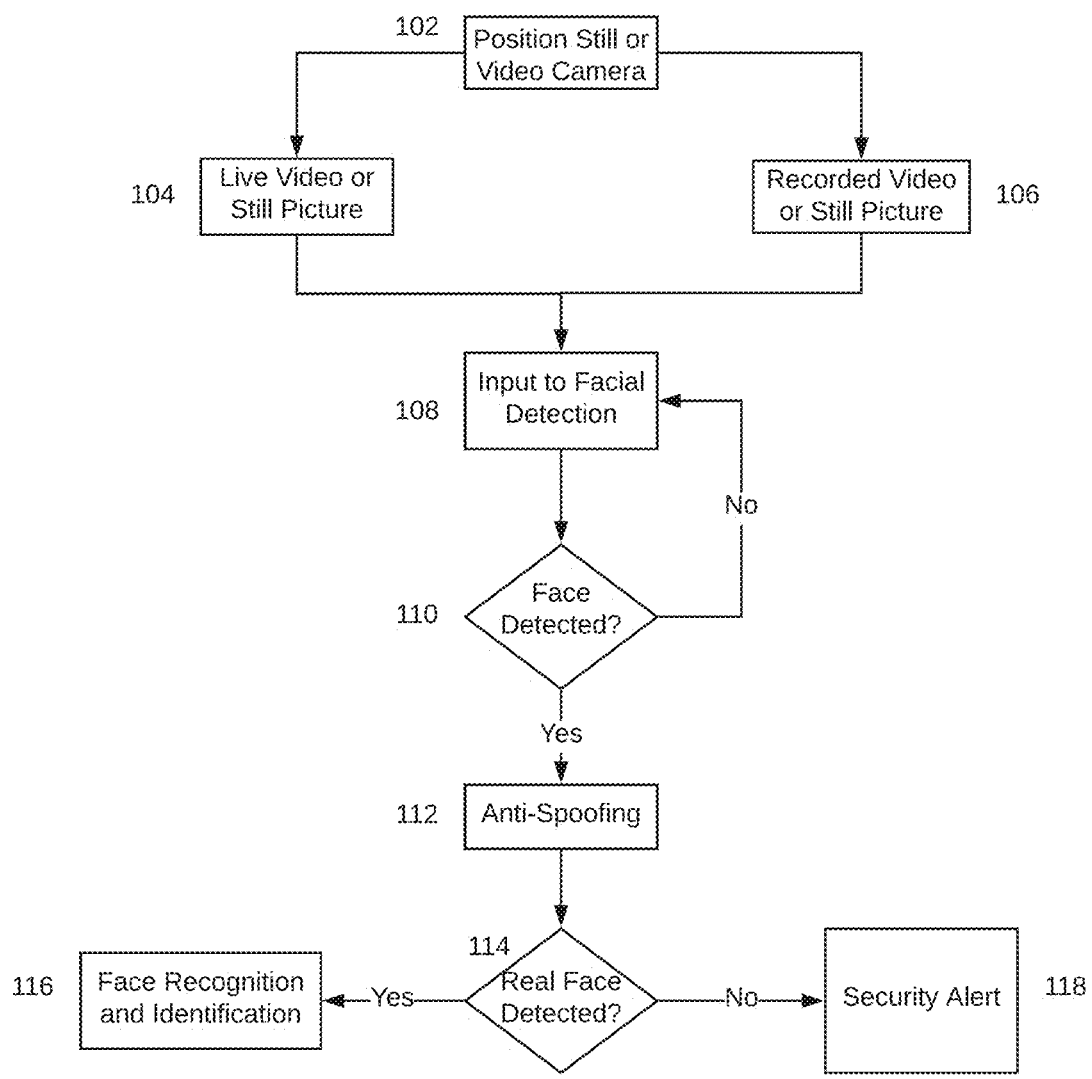
FIG. 1 is a high level flow chart showing overall flow of the system and method.

The flowchart of FIG. 1 depicts overall processing flow in accordance with an embodiment. At 102 a camera is positioned appropriately to cover a region of interest (ROI). In one aspect, the overall system, will include a facial detection module that can spot a face, and provide the face's location within the ROI. In some embodiments, the camera will be a video camera, to capture a person's movement, including turning or tilting of the head or body. In an embodiment, a series of consecutive frames (effectively, still pictures) may show the person's movement. In an embodiment, the camera may be a still camera, which can take a picture or a series of pictures of someone positioned in the ROI. By taking a series of pictures, it is possible to capture aspects of a person's movement, and use that information to aid in determining whether there is spoofing.

At 104, live video or still pictures are provided as inputs. At 106, recorded video or still pictures may be provided as inputs. At this initial stage of processing, there may be differentiation between a still image and video. For a video input, motion detection that works with previous consecutive frames, and a frame subtraction technique, may be employed. In one aspect, to help detect whether a person presenting himself or herself in front of the camera is a real person or a spoof, the person will stand in front of a background that does not change. When the person moves in front of the background, different parts of the background may be obscured from the camera. Processing the various frames would involve subtracting the background from the foreground. In one aspect, this will yield a binary mask for a foreground object. The foreground object may, and preferably does contain a detected ROI of the person's face. Aspects of this will be discussed in more detail below with respect to FIG. 2.

From either 104 or 106, at 108 the video or picture data are input to a facial detection/recognition system. If a face is detected, at 112 an anti-spoofing analysis will be conducted. If a face is not detected, the system will continue to monitor for detection of a face. In an embodiment, where the camera 102 operates periodically or continually, the background will be all that the camera 102 sees if there is no person or object in the ROI.

The anti-spoofing analysis, which will be discussed in greater detail below, will focus on whether the picture(s) or video(s) look genuine, or whether the person seeking entry is providing a false image (a spoof). The analysis of genuineness may be independent of the actual identity of the person seeking entry. At 114, if a real face is detected (that is, if it is determined that there is no spoofing), then at 116 a face recognition and/or identification process may be employed. Such a process may include comparing a photo ID of a user to the picture(s) or video. Since this system would be employed when or where there is no actual person to check someone's ID, the person seeking access may provide his/her photograph (from a driver's license, passport, or other official ID) to be scanned, with the scan being compared to confirm identification. In an embodiment, the person seeking access may be asked to input, via a keyboard, relevant identifying information to be used in verifying the person's identity.

If the picture(s) or video(s) look fake, that is, if a real face is not detected, then at 118 a security alert may be output. In an embodiment, the person simply may be denied entry, and perhaps notified that entry is being denied.

Figure 2:
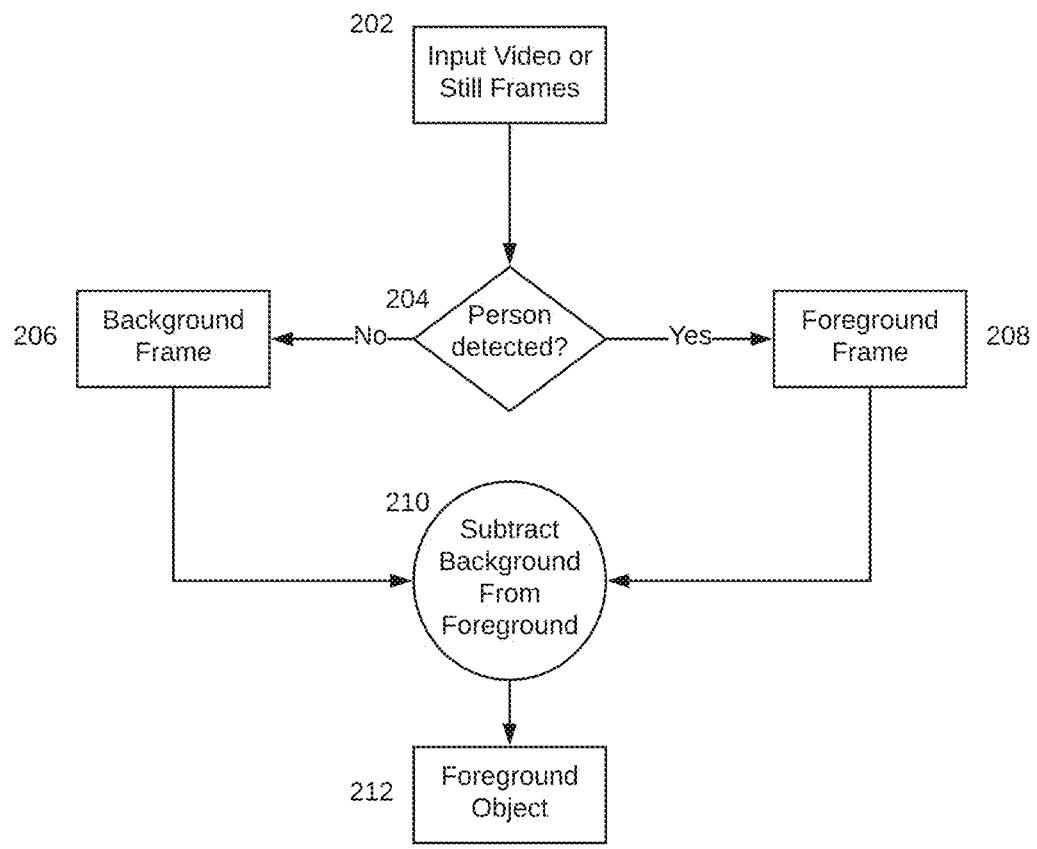
FIG. 2 is a high level flow chart showing aspects of image processing and analysis in accordance with an embodiment.

FIG. 2 depicts a high level flow of a process for detecting foreground information in the presence of background information. In the context of aspects of the present invention, this process involves looking at personal features, including facial features, of an individual seeking verification or admission, as foreground information, and distinguishing that foreground information from a backdrop which may form background. In FIG. 2, at 202 video frames are input. At 204, if a person is not detected, then the frames are determined to be background frames. In an embodiment, these may be obtained once, and stored for future use. However, in an embodiment, background frames will be captured until a person (or something else that gets into the ROI) is detected.

Captured background frames may be used as a template to be subtracted from frames for foreground objects. In one aspect, there may be a pixel level differentiation between foreground and background, to obtain color values as contrast between foreground and background. Where lighting conditions may change in the area where the person seeking admission will be, for example, if there is substantial sunlight or other natural light during the day, and artificial lighting mainly or only at night, the background may appear different at different times. In that circumstance, it will be desirable to have real-time background frames to compare against an individual appearing in the ROI during that time. The background frames would need to be calibrated in accordance with the current lighting environment before a person is detected.

At 204, if a person is detected, then at 208 foreground frame processing will occur. At 210, background will be subtracted from foreground, so that at 212, a foreground object—the object or individual to be verified—will be left.

Figure 3:
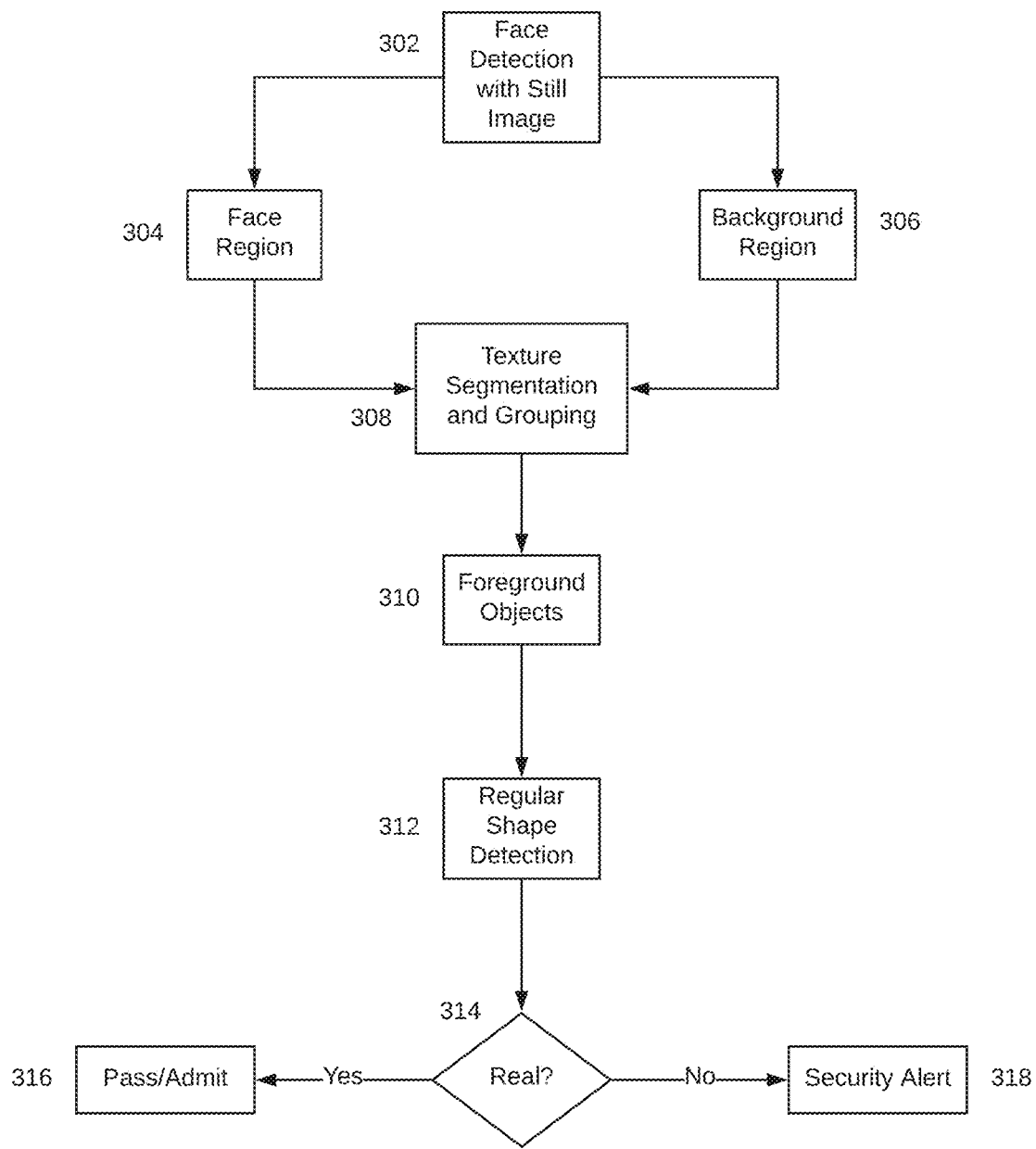
FIG. 3 is a high level flow chart showing aspects of image processing and analysis in accordance with an embodiment.
Figure 4:
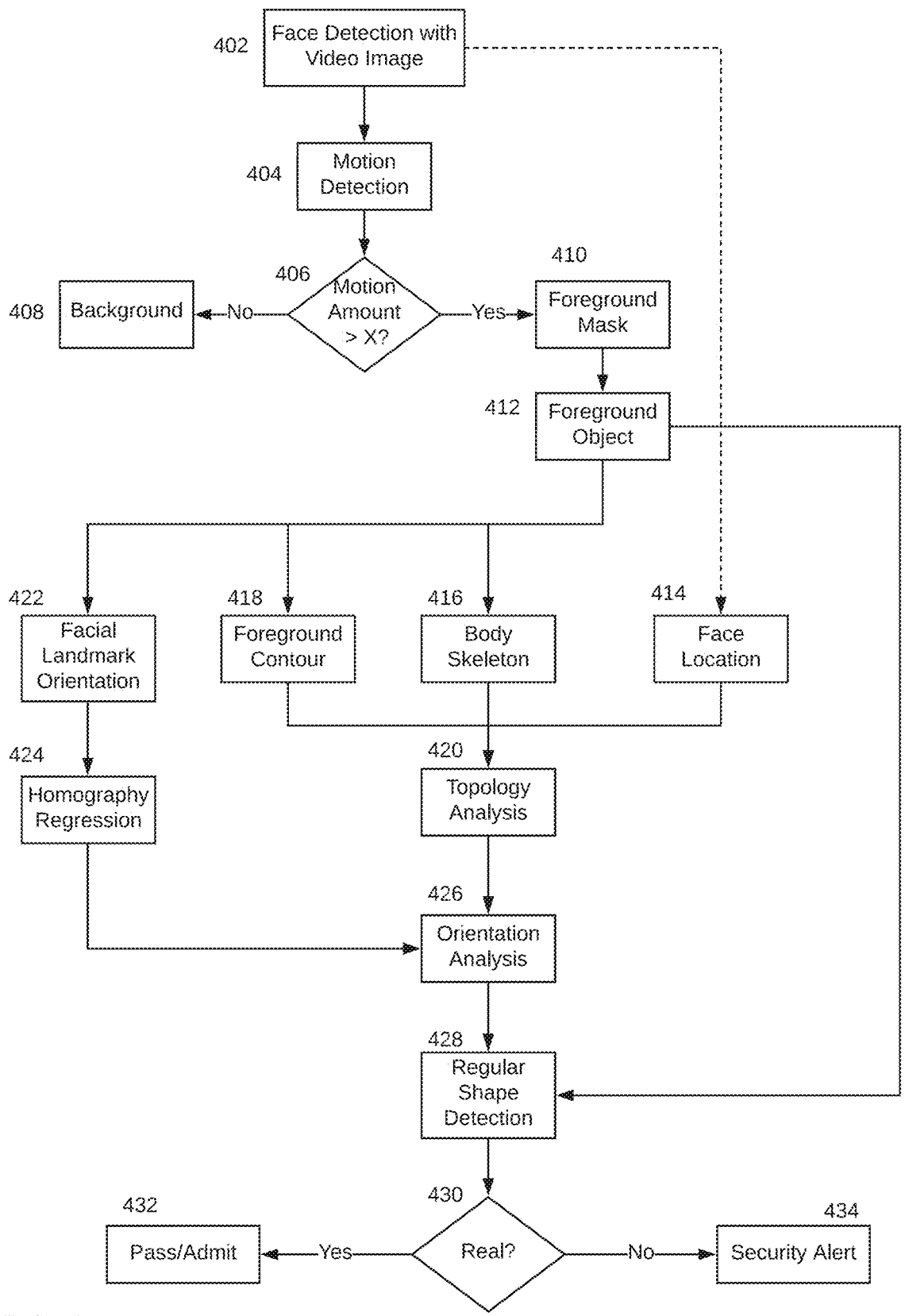
FIG. 4 is a more detailed flow chart showing different aspects of image processing analysis according to an embodiment.

FIGS. 3 and 4 respectively address detection situations in which the system input is an image or a video. FIG. 3 shows a flow of operation for anti-spoofing using a still image. At 302, a still image is taken of an individual in the region of interest. At 304, the face region of the still image is identified, and at 306, the background region of the still image is identified. At 308, a shape detection process begins.

As part of this process, a face will be detected in the still image. Texture in the detected face region will be separated from the background. In an embodiment, an image segmentation approach may be employed. If the texture in the detected face region is distinct from the background, there will be a clear boundary in the image. Within that boundary, various kinds of shapes and geometric patterns may be identified to help to judge whether there is a face present in that region.

At 310, foreground objects may be detected, and at 312, regular shapes within the image and/or region of interest may be detected. These detected objects and shapes may be used so that, at 314, a determination may be made whether the image is of a real person, or a spoof. If the image is real, then at 316 the individual is granted admission. If the image is not real, the individual may be denied admission. In one aspect, there may be a security alert to make it possible to apprehend the individual who is trying to spoof the system.

FIG. 4 shows a flow of operation for anti-spoofing using video. At 402, a video image may be obtained of an individual in the region of interest. At 404, motion detection within the region of interest may be observed and quantified. At 406, if the amount of motion detected does not exceed a predetermined amount, then at 408 the image is determined to be background. In the event that the image is determined to be background, then handling of the image to account for lighting conditions and the like will be as discussed previously. If the amount of motion detected does exceed a predetermined amount, then at 410 the image is determined to be foreground, and at 412, a foreground object is identified. In an embodiment, the foreground object may undergo regular shape detection at 428, and at 430, it may be determined whether the regular shape detection identifies a real person. If so, then at 432 the individual may be granted admission. If not, then at 434 the individual may be denied admission. In one aspect, there may be a security alert to make it possible to apprehend the individual who is trying to spoof the system.

In other aspects of FIG. 4, from the video image taken at 402, at 414 face location may be identified. From the foreground object identified at 412, there may be a breakdown of the object. At 416, a body skeleton may be identified. In one aspect, skeleton identification is a derivation from the portion of a person's torso that appears within the ROI. As will be discussed later with respect to FIGS. 9A-9D, skeletal positioning within the ROI may be used to determine whether spoofing is occurring. At 418, a contour of the foreground object may be identified. At 420, the information regarding face location, body skeleton, and foreground contour may be input to enable performance of a topology analysis. In FIG. 4, all of the information from elements 414, 416, and 418 are shown as inputs to perform topology analysis. In an embodiment, all three of these elements may be employed to determine whether spoofing is occurring. However, fewer than all of these may be employed.

At 422, there may be a determination of facial landmark orientation of the foreground object from 412. At 424, there may be some analysis of that orientation, for example, a homography regression. At 426, the results of the topology analysis and the homography regression may be combined to enable an orientation analysis of the image. This analysis may be used later on as part of the overall detection/anti-spoofing process, as will be discussed. In video, images move. As they move, certain portions of the image within the ROI will be expected to move in a particular way if the image is of a real person.

At 428, shape detection is carried out. As part of this detection process, information on the foreground object (the person of interest within the ROI) from 412 may be employed. At 430, if the person of interest is determined to be genuine, then at 434 access is provided. If there is spoofing, then at 434 access is denied and, in an embodiment, there may be a security alert.

Some additional detail regarding facial location and identification of foreground contours now will be discussed with reference to FIGS. 5A-5D. Initially, it should be noted that it is possible to detect the main contour of the foreground object. From the location of a face and the relationship of that location to the main contour of the foreground object, it is possible to conclude whether spoofing is occurring. The general approach may be appreciated with reference to FIGS. 6A-6D, which show, respectively: 1) An authentic face with detected face ROI; 2) A spoofing face in front of a real person; 3) A spoofing face floating in a center of the image; and 4) A spoofing face with a cutout contour in the center of image. In each of these cases, the detected face ROI may be located at different positions relative to the main contour. For example, in FIGS. 6A and 6D, the face ROI is at the border of the contour, whereas in FIGS. 6B and 6C, the detected face ROIs are in the center of the foreground region, some distance from each of the margins. From this distinction, it can be appreciated that the position of the face ROI relative to the margins can provide an indication of spoofing.

Figure 6A:
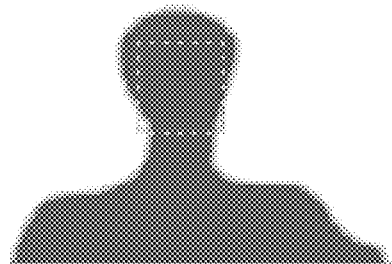
FIGS. 6A-D depict scenarios involving different kinds of foreground objects, according to an embodiment.
Figure 6B:
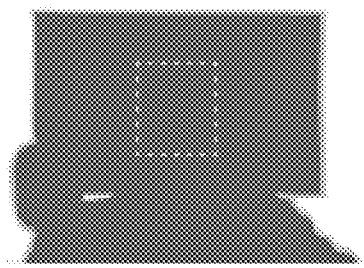
Figure 6C:
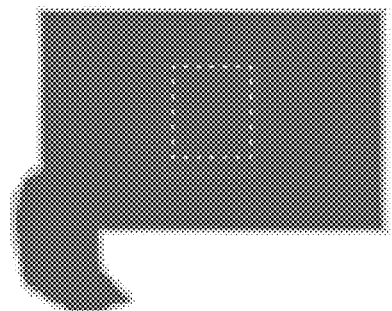
Figure 6D:
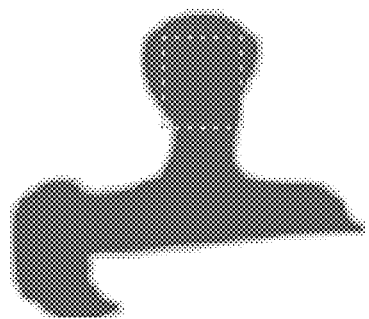
Figure 7A:
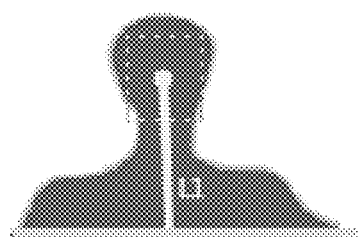
FIGS. 7A and B depict various elements used to analyze foreground objects, and depict scenarios involving different kinds of foreground objects, according to an embodiment.
Figure 7B:
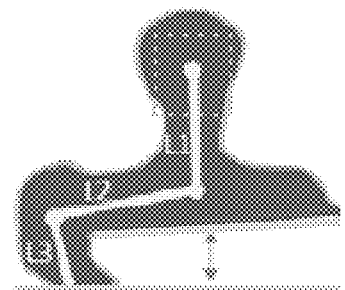

In the case of a picture or photograph, or a digital display, the appearance in FIGS. 6B and 6C (distance of face ROI from the margins) are most likely. Consequently, these cases can be identified and removed from further inference or analysis. In the case of FIGS. 6A and 6D, it is appropriate to investigate a topological position of the main contour with the boundary of the image, as FIGS. 7A and 7B illustrate.

In one aspect, the minimum distances from the center of detected face to the bottom of image are computed recursively. Those distances may be sampled and compared, for example, between FIGS. 6A and 6B. Looking at both of these Figures, it is easy to appreciate that the distance from an authentic face (FIG. 6A) is less than the distance from a spoofing face (FIG. 6B). In an embodiment, the four corners of the detected face region may be used as references to compute the distances between the contour and the face. A distance between each contour point and a respective corner point may be computed. The minimum distance may be returned as a nominal distance, as may be appreciated from the following relationship:

$$D_i = \min |F_i - C_j|$$

i: corner point index j: contour point index

The Euclidean distance is applied in the computation:

$$|F_i - C_j| = \sqrt{(x_i - x_j)^2 (y_i - y_j)^2}$$

i: corner point index j: contour point index

Figure 5A:
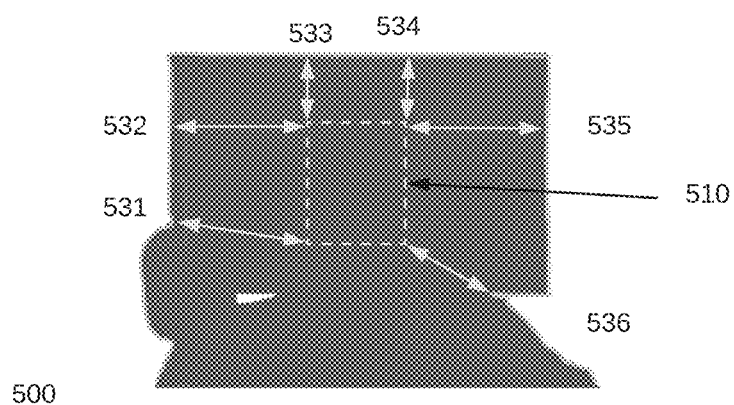
FIGS. 5A-D depict various elements used to analyze foreground objects, according to an embodiment.

FIG. 5A, which corresponds in appearance to FIG. 6B, shows a foreground object 500 with a face ROI 510, and arrows 531-536 between corner points of the ROI 510 and contour points on the foreground object 500. The foregoing equations may be used to effect these calculations.

Figure 5B:
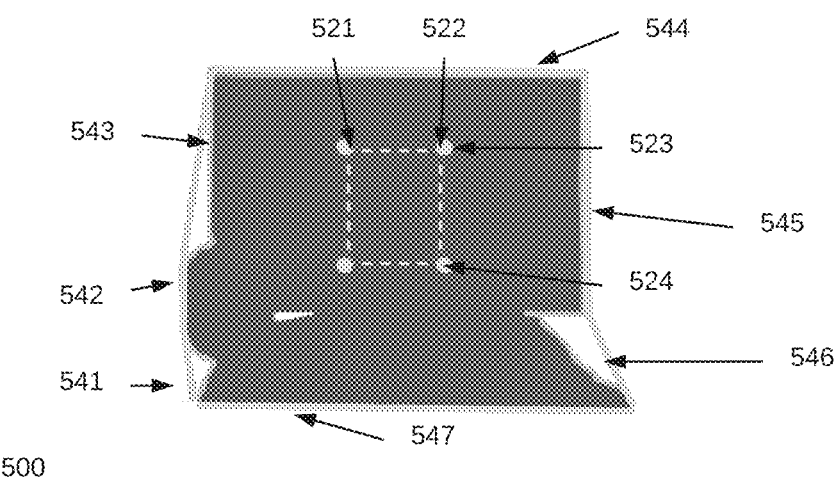
Figure 5C:
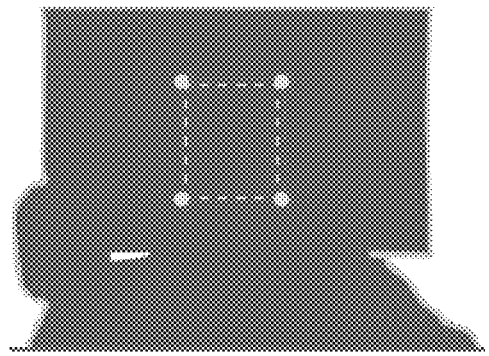
Figure 5D:
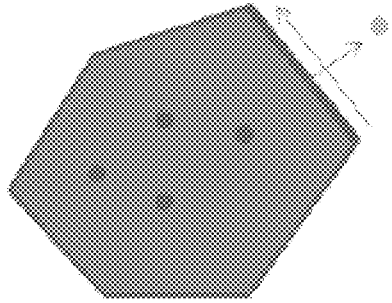

Referring now to FIGS. 5B and 5C, foreground contour points may be used to construct a convex hull, such as in FIG. 5D. FIG. 5B shows corner points 521-524 of face ROI 510, and also shows some contour lines 541-547 around foreground object 500. FIG. 5C is like FIG. 5B, but without the contour lines. In an embodiment, for each corner point of the face ROI 510 in FIG. 5A, computational geometry in-a hull line sweep algorithm may be used to facilitate a decision whether a given point is inside the convex hull. If all corners are in the convex hull, the face region is determined to be within the foreground contour region.

Different spoofing scenarios now will be discussed with reference to FIGS. 6A-6D. FIG. 6A depicts a real person. The bottom of the foreground object corresponds to the bottom of the image. FIG. 6B depicts a spoof, for reasons discussed above with respect to FIG. 5A. FIG. 6C also depicts a spoof. The arm apparently holding up a picture or photograph or tablet connects to the bottom of the image. However, what would or should correspond, for example, to a torso or what traditionally would be viewed as a wider portion of a person, given the location of the face, does not connect to the bottom of the image. Likewise, in FIG. 6D, while the cutout of a person's torso looks more realistic than does the rectangular image in FIG. 6C, the bottom of the torso does not connect to the bottom of the image, thereby indicating a spoof.

FIGS. 7A and 7B are foreground objects that look like the foreground objects of FIGS. 6A and 6D, respectively. In FIG. 7A, a single line L1 connects a center of a face position with a bottom of the image within the foreground object. This connection is one way of indicating that FIG. 7A depicts a real person. By comparison, in FIG. 7B, there is a separation between the bottom of the foreground object and the bottom of an image. Consequently, the line L1 does not extend from the face position to the bottom of the image. Rather, a path to the bottom of the image requires additional lines L2 and L3. This type of connection is one way of indicating that FIG. 7B is a spoof.

Figure 8A:
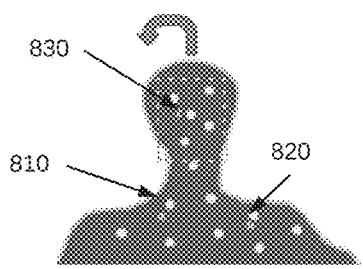
FIGS. 8A-D depict various elements used to analyze foreground objects, and depict scenarios involving different kinds of foreground objects, according to an embodiment.
Figure 8B:
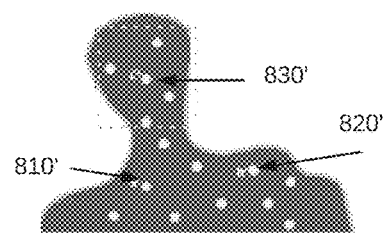

In the case of a cutout picture or photograph being used to spoof the system, an additional transformation evaluation, referred to earlier as facial landmark orientation, may be performed, as now will be discussed with respect to FIGS. 8A-8D. The idea is that the features on a printed photograph are fixed, so that a rigid transformation always can be found using both correspondence between points, and regression. For example, looking at FIGS. 8A and 8B, which are pictures, there is correspondence between respective pairs of points 810, 810'; 820, 820'; and 830, 830'. FIG. 8B represents a counterclockwise tilting of the picture in FIG. 8A. The relative positioning of points in the respective Figures would reflect a rigid transformation. Thus, referring to points 810 and 810' as a and a', respectively, a transformation matrix for these two points may be computed as follows:

$$\begin{bmatrix} a'_x \\ a'_y \\ a'_z \\ 1 \end{bmatrix} = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} \begin{bmatrix} a_x \\ a_y \\ a_z \\ 1 \end{bmatrix} = [R|t] \begin{bmatrix} a_x \\ a_y \\ a_z \\ 1 \end{bmatrix}$$

R: rotation matrix t: translation matrix

Figure 8C:
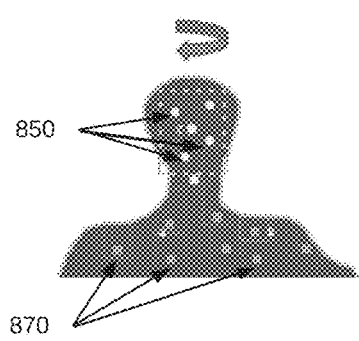
Figure 8D:
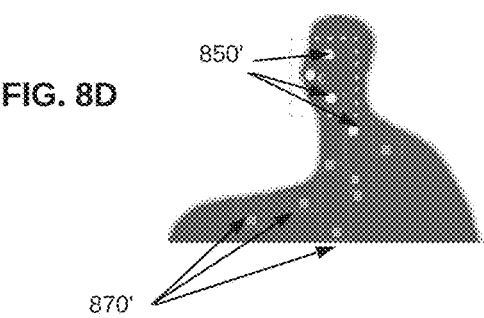

The linear transformation for a spoofing face (as in FIGS. 8A and 8B) can be reversely evaluated and computed through a technique called random sample consensus (RANSAC), from which there is a deterministic and dominant rigid transformation (denoted by φ above the arrow between FIGS. 8A and 8B) between the corresponding points, even if there are few outlier and mismatched points. However, such a rigid transformation is difficult to nearly impossible for a real face because when there is a change of perspective, and perhaps a change in lighting conditions accompanying the change of perspective, there will be some nonlinearity. For example, looking at FIGS. 8C and 8D, which depict a real person, the points 850 in the vicinity of the person's head move differently than do the points 870 on the person's body when the person turns, as can be seen from a comparison of respective points 850, 850' and 870, 870'. If the foreground objects in FIGS. 8C and 8D were of a picture and not a person, the change in positions of the respective sets of points would be different from what FIGS. 8C and 8D show. The lack of rigidity of the transformation in FIGS. 8C and 8D (as denoted by the ≠φ above the arrow between FIGS. 8C and 8D) would indicate that the person in the ROI is a real person and not a spoof.

From the foregoing, ordinarily skilled artisans will appreciate that a system according to one or more embodiments may take advantage of tilt or rotation as exemplary types of movement of an individual within an ROI, to help determine whether a spoof is being attempted.

Figure 9A:
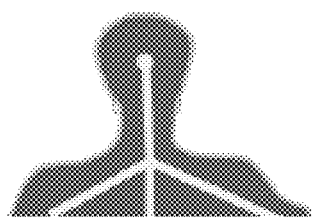
FIGS. 9A-D depict various elements used to analyze foreground objects, and depict scenarios involving different kinds of foreground objects, according to an embodiment.
Figure 9B:
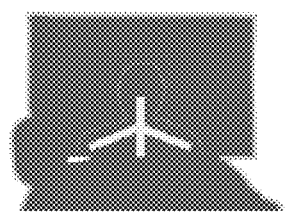
Figure 9C:
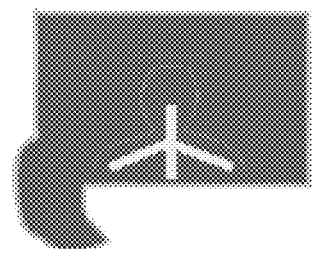
Figure 9D:
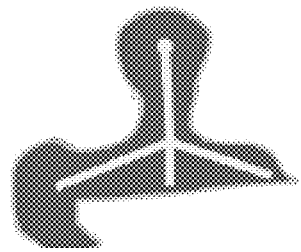

Looking at another aspect, if the foreground image has enough information to compute a skeletal structure of a person's upper body, that information can be used to identify and exclude instances of spoofing. FIGS. 9A-9D correspond to FIGS. 6A-6D. Looking first at FIG. 9A, which shows a real person, a skeletal structure 910 derived from the person's upper body extends to the bottom of the image. In contrast, looking at FIGS. 9B-9D, the derived skeletal structure will not extend to the bottom of the image, whether taken from an overall picture, as in FIGS. 9B and 9C, or from a cutout, as in FIG. 9D. Consequently, it is possible to conclude that FIGS. 9B-9D are attempts at spoofing. It should be noted that there is a certain amount of information required in order to compute the skeleton of the human body accurately. In an embodiment, the foreground mask on an original RGB image may be used to obtain a foreground object with human body inside. As an example, a suitably trained neural network-based model may detect the human shape and derive the skeleton from the foreground.

In general, if a static photograph or picture is presented to the camera, the face detection engine in the camera will find a face within the ROI. However, the lack of contour in the picture (two dimensional rather than three dimensional) means it may not be possible to identify an appropriate face ROI topological relationship. In such a circumstance, in one embodiment image segmentation may be applied to separate the texture in the detected face region from the background. Detection of that texture distinct from the background will help to form a clear boundary in the image. Geometric shapes and patterns, in particular regular patterns, can help to judge the reality of the detected face. Using such geometric information can form a robust model to help identify that a face within an ROI is a spoofing face and not a real one.

Figure 10A:
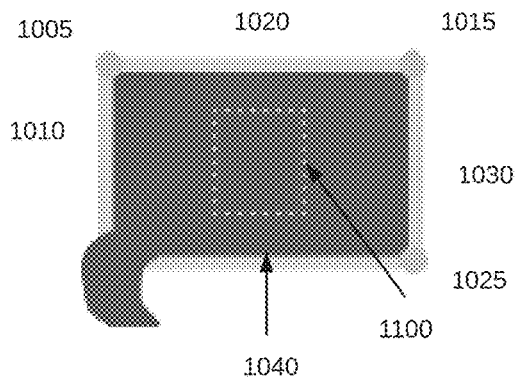
FIGS. 10A-D depict various elements used to analyze foreground objects, and depict scenarios involving different kinds of foreground objects, according to an embodiment.
Figure 10B:
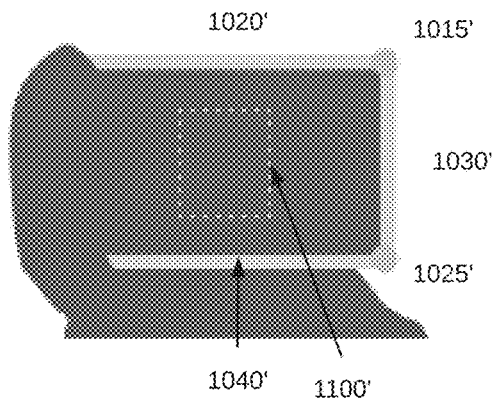
Figure 10C:
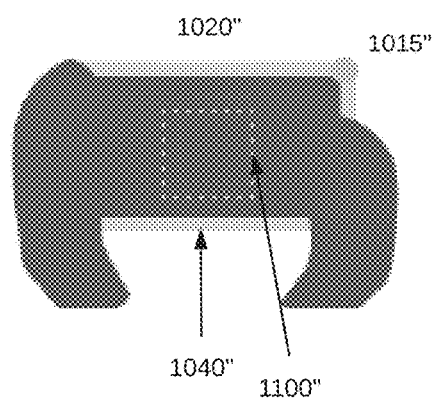
Figure 10D:
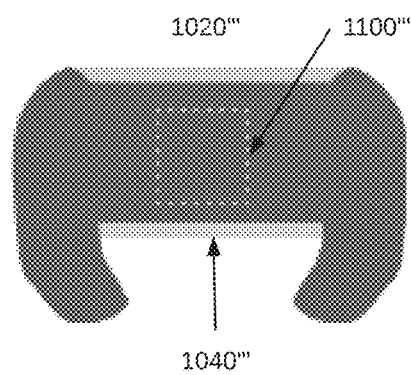

FIGS. 10A-D show different spoofing scenarios which may be detected through detection of various geometric shapes and patterns. In FIG. 10A, a hand is holding a tablet or a photograph with a person's face in the dotted region 1100. It is possible to detect three corners 1005, 1015, and 1025, and possibly four lines of contrast 1010-1040 between the tablet or photograph and the remaining background in the ROI. Such detection enables determination of a spoof. In FIG. 10B, the person's face would be in dotted region 1100'. There are only two corners 1015' and 1025', and two lines 1020', 1030' (and part of a third line 1040', except that there appears to be a portion of a torso under the line 1040'). The tablet or photograph is being held up in front of the false person's face, with some of the torso extending below the tablet or photograph. As a result, one of the lines which would be parallel with the upper line in the Figure is missing. However, the existence of the two corners and the accompanying contrasts help lead to the conclusion that a spoof is being attempted. Here again, the nature of the contrasts between the tablet or photograph and the remaining background in the ROI lead to the determination that a spoof is being presented. FIG. 10C is similar to FIG. 10A, with the person's face in dotted region 1100", but there is only one corner 1015" because two hands are holding the photograph or tablet. However, there still are parallel lines 1020" and 1040", again indicating a spoof because of the nature of the contrasts between the tablet or photograph and the remaining background in the ROI. Finally, FIG. 10D has the person's face in dotted region 1100'''. The Figure shows no corners, but there still are parallel lines 1020''', 1040'''. Consequently, the system can detect a spoof because of the nature of the contrasts between the tablet or photograph and the remaining background in the ROI. However, it should be noted that the lower parallel line 1040''' can, for example, correspond to the lower edge of the ROI. In that event, it could be quite difficult to mark the FIG. 10D scenario as a spoof. Instead of geometric criteria such as the ones just discussed, other criteria may have to come into play.

In all of the scenarios in FIGS. 10A-D, the nature of the contrasts is different from the contrasts that would exist if a real person were posed in the ROI. If a real person were posed in the ROI, the parallel lines in FIGS. 10A-D and the resulting contrasts would not exist. Ordinarily skilled artisans will appreciate that there are other spoofing scenarios that the use of a tablet or photograph would present that would enable a determination that a spoof is being attempted.

In general, the hierarchy of difficulty for detecting spoof may be considered as follows, 1 being the easiest and 6 being the hardest:

1. A face within a frame in a picture or photograph, or on an electronic device;
2. A cutout face with in a picture or photograph, or on "frameless" electronic device, e.g. one with a very narrow bezel;
3. A cutout face with a portion of the spoofing person's torso that is similar in size with the upper body or torso of a real person;
4. A cutout body shape or model which looks like a real body shape;
5. Printed 3D upper body model;
6. Printed 3D model.

Various places in the foregoing description refer to different computer vision related techniques. Ordinarily skilled artisans will appreciate that many of these techniques may be implemented through libraries such as the Open Source Computer Vision Library (OpenCV). OpenCV is but one example; ordinarily skilled artisans may have recourse to other such libraries, some of which may be publicly available, some available under license, and some proprietary.

Figure 11:
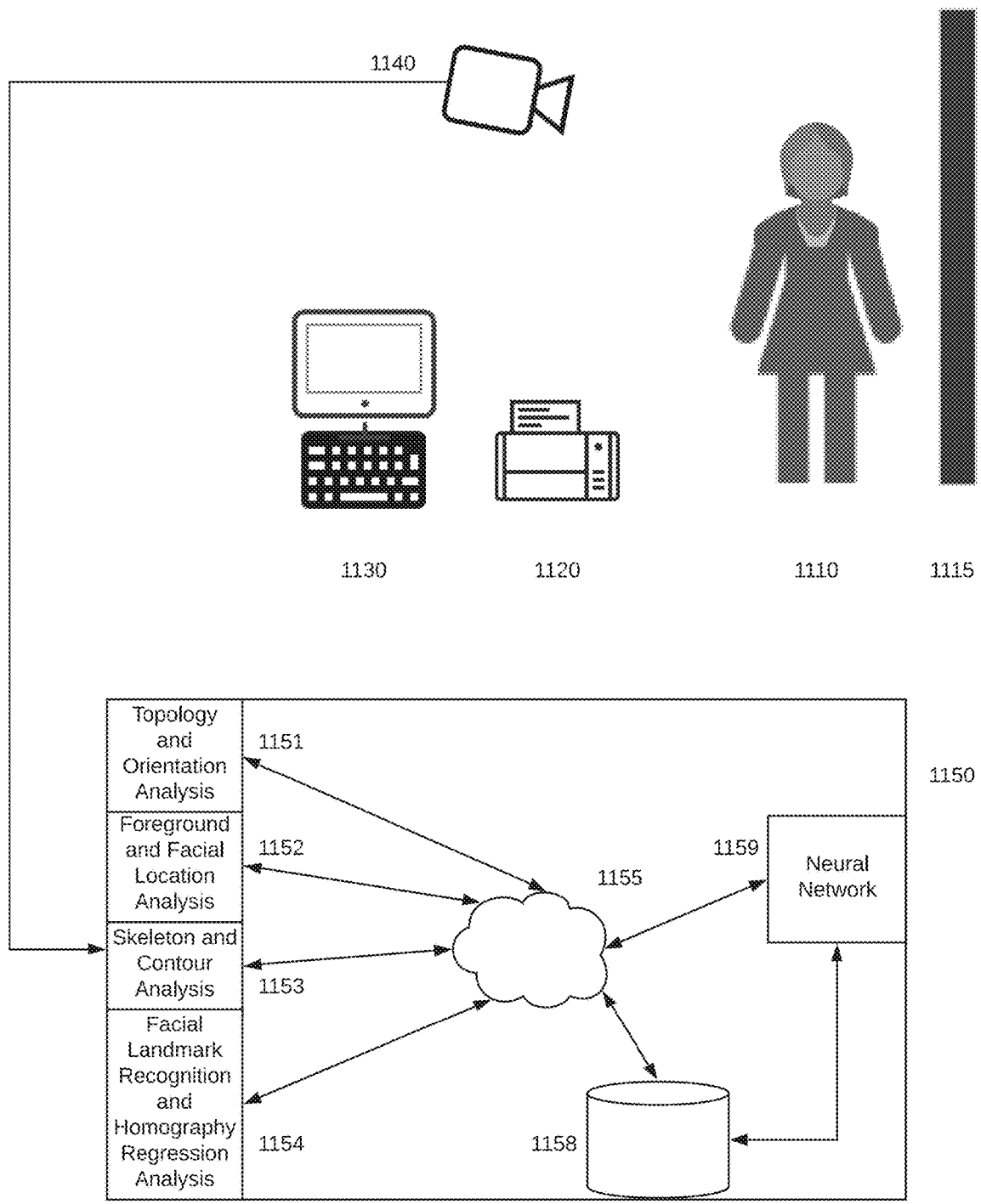
FIG. 11 is a high level diagram of a system according to an embodiment.

FIG. 11 depicts, at a high level, a system for implementing the anti-spoofing methods detailed above. In FIG. 11, an individual 1110 stands against a background 1115.

As part of the process of authentication, admission, or access, the individual 1110 may enter certain information on a keyboard 1130, or may have some form of identification (for example, a drivers' license, a government ID, a passport, or a passport card) in scanner 1120. A camera 1140 records images of the individual 1110. It should be noted that it is possible that multiple individuals will be standing against the background 1115. In an embodiment, one or more elements of the system may focus on the closest individual to the camera 1140, on the assumption that that is the individual to be authenticated. Any other individuals visible against the background 1115 will be treated as part of the background.

The image information for the individual 1110 is provided to a system 1150, comprising various processors and volatile and non-volatile storage. Components of system 1150 include various computing structure 1151-1154 to implement the various types of computer vision algorithms discussed earlier. The computing structures are not detailed here. Various functions discussed earlier are grouped together merely for ease of reference. The grouping should not be taken to infer that the specific functions called out within a particular computing structure block necessarily are performed together, or that they go together. A neural network 1159 may be involved in implementing one or more of the algorithms. In an embodiment, the various computing structure may communicate directly with the neural network, or may do so through a communications network 1155. In an embodiment, the neural network may be accessible in the cloud. Results of the calculations may be stored in storage 1158, which may be connected to the neural network 1158 or computing structure 1151-1154 in any number of ways, one way being shown in FIG. 11 merely as an example.

While the foregoing specification describes various aspects and embodiments of the present invention, the invention is not limited by that particular description. Rather, the scope of the invention is defined by the following claims.

What is claimed is:

1. A method comprising:
   obtaining an image to be analyzed, the image comprising one of a still image or a video image;
   identifying a boundary of the obtained image;
   identifying a foreground object from the obtained image using one or more computer vision techniques;
   performing one or more analyses on the foreground object using a computing system, the analyses selected from the group consisting of foreground contour analysis, facial landmark orientation analysis, and skeletal analysis; and
   responsive to the performing, determining whether the foreground object represents an attempt to spoof a process to authenticate an individual as an authorized individual.

2. A method according to claim 1, further comprising identifying a facial region of interest within the foreground object using one or more computer vision techniques.

3. A method according to claim 1, wherein the identifying the foreground object comprises comparing a predetermined number of video frames to distinguish stationary portions within the frames from moving portions within the frames.

4. A method according to claim 1, wherein the identifying the facial region of interest comprises identifying facial landmarks within the foreground object.

5. A method according to claim 4, further comprising performing a homography regression on results of identifying the facial landmarks.

6. A method according to claim 1, wherein the performing comprises performing the foreground contour analysis followed by the facial landmark orientation analysis.

7. A method according to claim 1, wherein the performing comprises performing the facial landmark orientation analysis, the performing the facial landmark orientation analysis comprising computing a transformation matrix on the foreground object.

8. A method according to claim 3, wherein the comparing comprises performing an orientation analysis on the foreground object after the performing the one or more analyses on the foreground object.

9. A method according to claim 8, wherein performing the orientation analysis comprises:
   identifying a first plurality of points in the foreground object when the foreground object is in a first position within the boundary, and a second plurality of points in the foreground object when the foreground object is at a second position within the boundary; and
   responsive to a determination that positions of the first plurality of points and the second plurality points correspond to a rigid transformation, determining the foreground object to be a spoof.

10. A method according to claim 1, wherein the performing comprises performing foreground contour analysis, the performing foreground contour analysis comprising determining a contour of the foreground object using one or more computer vision techniques and measuring a distance of the facial region of interest from the contour,
   the method further comprising, responsive to determining that the distance of the facial region of interest from the contour exceeds a predetermined amount, determining the foreground object to be a spoof.

11. A method according to claim 1, wherein the performing comprises performing skeletal analysis, the performing skeletal analysis comprising analyzing, using computer vision techniques, the foreground object and, responsive to a determination that the foreground object represents a person, deriving a position of one or more skeletal features within the foreground object.

12. A method according to claim 11, further comprising:
   measuring a distance of the one or more skeletal features from the boundary of the obtained image, and
   responsive to a determination that the measured distance is non-zero, determining the foreground object to be a spoof.

13. A computer-implemented system to perform a method comprising:
   obtaining an image to be analyzed, the image comprising one of a still image or a video image;
   identifying a boundary of the obtained image;
   identifying a foreground object from the obtained image using one or more computer vision techniques;
   performing one or more analyses on the foreground object using a computing system, the analyses selected from the group consisting of foreground contour analysis, facial landmark orientation analysis, and skeletal analysis; and responsive to the performing, determining whether the foreground object represents an attempt to spoof a process to authenticate an individual as an authorized individual.

14. A computer-implemented system according to claim 13, wherein the identifying the foreground object comprises comparing a predetermined number of video frames to distinguish stationary portions within the frames from moving portions within the frames.

15. A computer-implemented system according to claim 13, wherein the performing comprises performing the foreground contour analysis followed by the facial landmark orientation analysis.

16. A computer-implemented system according to claim 14, wherein the comparing comprises performing an orientation analysis on the foreground object after the performing the one or more analyses on the foreground object.

17. A computer-implemented system according to claim 16, wherein performing the orientation analysis comprises:
identifying a first plurality of points in the foreground object when the foreground object is in a first position within the boundary, and a second plurality of points in the foreground object when the foreground object is at a second position within the boundary; and
responsive to a determination that positions of the first plurality of points and the second plurality points correspond to a rigid transformation, determining the foreground object to be a spoof.

18. A computer-implemented system according to claim 13, wherein performing foreground contour analysis comprises determining a contour of the foreground object using one or more computer vision techniques and measuring a distance of the facial region of interest from the contour,
the method further comprising, responsive to determining that the distance of the facial region of interest from the contour exceeds a predetermined amount, determining the foreground object to be a spoof.

19. A computer-implemented system according to claim 13, wherein the performing comprises performing skeletal analysis, the performing skeletal analysis comprising analyzing, using computer vision techniques, the foreground object and, responsive to a determination that the foreground object represents a person, deriving a position of one or more skeletal features within the foreground object.

20. A computer-implemented system according to claim 19, wherein the method further comprises:
measuring a distance of the one or more skeletal features from the boundary of the obtained image, and
responsive to a determination that the measured distance is non-zero, determining the foreground object to be a spoof.

* * * * *